Jan. 31, 1961 W. H. KLIEVER 2,970,292

BINARY SCALE READING SYSTEM

Filed Oct. 22, 1956

3 Sheets-Sheet 1

WALDO H. KLIEVER *INVENTOR.*

BY Max L. Wymore

AGENT

WALDO H. KLIEVER *INVENTOR.*
BY Max L. Wymore
AGENT

Jan. 31, 1961 W. H. KLIEVER 2,970,292

BINARY SCALE READING SYSTEM

Filed Oct. 22, 1956 3 Sheets-Sheet 3

WALDO H. KLIEVER *INVENTOR.*

*BY* Max L. Wymore

AGENT

United States Patent Office 2,970,292

Patented Jan. 31, 1961

2,970,292

BINARY SCALE READING SYSTEM

Waldo H. Kliever, 2472 Overlook Road, Cleveland Heights, Ohio

Filed Oct. 22, 1956, Ser. No. 617,415

9 Claims. (Cl. 340—172.5)

This invention relates to a system for the automatic reading of a binary scale and reader combination such as that set forth and claimed in patent application S.N. 573,154, filed March 22, 1956, entitled "Binary Scale Reader," of which the applicant is a joint inventor. More specifically this invention relates to an electronic system for the automatic reading of a binary scale and reader combination of the type indicated.

It is an object of this invention to provide an electronic reading system for a binary scale and reader combination with the attendant advantages of electronic circuitry, namely rapid reading, elimination of mechanical moving parts and providing high sensitivity.

It is a further object of this invention to provide a system for reading a binary scale and reader combination in which the reading or interrogation can be controlled or carried out in a prearranged program.

In accordance with the invention the reading system comprises a first pair of sensing devices having output circuits adapted to produce an output signal on being activated, comparator means having two inputs and two outputs for comparing the output signal produced by each sensing device to develop a comparator voltage on the respective one of said outputs corresponding to the sensing device output signal having the greater amplitude, means for applying the sensing device output signals to the comparator inputs.

The system further includes a first gate means having at least one input and an output for transmitting a gate voltage equivalent to the comparator output voltage in response to the application of said comparator voltage and an interrogation signal and means for applying the comparator output voltage and the interrogation signal to the inputs of the gate means. The system further includes a first bistable circuit means having two outputs and two inputs adapted to develop and sustain a first readout signal on one of the outputs in response to the application of a gate voltage to the respective input and means for applying the gate voltage to the respective input. The system further includes a second pair of sensing devices each having an output circuit adapted to produce an output signal on the sensing device being activated, second gate means having at least two inputs and an output for transmitting a gate voltage equivalent to the first readout signal in response to the application of the first readout signal, an output signal from a sensing device and an interrogation signal to the inputs of the gate means and means for applying the sensing device output, first readout signal and the interrogation signal to the gate inputs. The system further includes a second bistable circuit means having two outputs and two inputs adapted to develop and sustain a second readout signal on one of the outputs in response to the application of a gate voltage to one input and means for applying the gate voltage from a second gate to the input of the bistable circuit means. The system further includes a reading control means adapted to supply an interrogation signal to an input of each gate means on command and further adapted to supply a reset voltage to the second input of the second and succeeding bistable circuit means to reset the bistable circuit means to a predetermined state prior to a subsequent reading.

For a better understanding of the present invention, together with other and further objects thereof, reference is had to the following description taken in connection with the accompanying drawing and its scope will be pointed out in the appended claims.

The conventional binary scale has $n$ columns of effectively transparent and effectively opaque areas arranged in a conventional binary progression, each having $2^n$ rows, where $n$ is the number of binary digits in the scale. The conventional binary progression is one in which the effectively transparent and effectively opaque areas are disposed in columns such that each column represents ascending powers of two.

Where data is a number in the binary system, or scale of two, in which only the digits 0 and 1 occur, the number 2 in the normal decimal scale corresponds to the number 1 0 in the binary scale, and may be represented by the simultaneous states of two signals, the first of which is in the 1-state and the second in the 0-state. Similarly, the decimal scale number 3 is represented by both signals being in the 1-state and the decimal number 4 by three signals, the first of which is in the 1-state and the other two in the 0-state.

The signals may have a variety of physical forms, depending on the scale and reader, usually electrical or mechanical in nature, although signals of an optical, magnetic or other nature could be employed if desired. The data in the form of signals is commonly transmitted from an input or source to an output by way of one or more channels in the form of pulses which again may assume various physical forms. The absence of a pulse, in the ordinary significance of the term, on any significant channel or at any significant instant, may represent a digit 0 in the appropriate place in a number, and may also be regarded as the "pulse" or like phenomenon in the same way as that which represents the digit 1, since it has a discrete and unique interpretation.

From this it follows that, if a digit—say, 0—is to be represented by the absence of a pulse in a significant place in the pattern, the corresponding effectively opaque or effectively transparent area may be physically indistinguishable from its general background—for example, if the effectively opaque or effectively transparent areas appear on an effectively opaque or effectively transparent backing, an effectively opaque or effectively transparent area representing the digit 0 is constituted by a significant zone of the surface of the backing which may not be specifically defined by a boundary. The term effectively opaque or effectively transparent area is to be understood as including such a significant, though physically undefined, zone.

In this specification, the term "effectively opaque area" or "effectively transparent area" will be used to signify any durable discrete phenomena which is capable of identification and presentation as a signal to which a unique interpretation can be assigned. Such areas are to be understood as being effectively transparent or opaque to all forms of electromagnetic energy as well as physical movement. The process of identification and presentation will be termed herein "reading" and the term "durable" is intended to indicate that the effectively opaque areas and effectively transparent areas are not destroyed or changed by the reading process. A signal may be constituted by an electrical pulse or a mechanical displacement or any other identifiable occurrence such as an optical, magnetic or audible effect. A group or train of signals will be understood to include the case of a single signal or the absence of a signal in a single significant place where such a single significant place has a definite or discrete interpretation. The term "decimal digit position" is used to identify a particular row. A conventional binary scale having five columns will have $2^5$ or 32 rows corresponding to 32 digit positions ranging from digit 0 position to digit 31 position.

The present invention is primarily concerned with an electronic system for the automatic reading of a reader which, when read in conjunction with a conventional binary scale, generates signals which represent, in digital form, the data to be transmitted. This data may have any desired significance but frequently represents the instantaneous position of a movable member, or the value of a function such as a trigonometrical ratio of an angular displacement of a rotatable member.

Preferably the binary scale and reader are constituted by areas representing a change in the characteristic of a surface and the reading means comprises means for detecting and responding to the said change.

The change may be of an optical nature and the reading means may comprise a light-sensitive element responsive to the optical change. Thus, for example, the binary scale and reader may comprise a plurality of transparent areas on a generally opaque background, or vice versa. The reading means may then comprise one or more light sources and one or more photo-cells located on opposite sides of the scale and the reader and a means is provided for causing relative movement between the scale and reading means. Where the reading means comprises single light sources and a plurality of photo-cells the reading may be accomplished by switching the photo-cells. Where the reading means comprises single photo-cells and a plurality of light sources the reading may be accomplished by switching the light sources. Where the reading means comprises both a plurality of light sources and a plurality of photo-cells, either the light sources or photo-cells may be switched to accomplish reading as will be understood by those skilled in the art.

Commonly, the reader used with a conventional binary scale constructed with opaque areas representing binary "0" and transparent areas representing binary "1," comprises a single transparent area or slit traversing the columns of the scale parallel to the rows. The dimension of said area, measured along the column, is generally the same as the dimension of the transparent area of the column having the finest divisions or as commonly known in the art as the least significant column, since it represents the least significant digit. As the scale is traversed by the reader each segment of the columns in the row defined by the reader is in turn exposed to the light source and a photo-cell. Thus, if a row in a scale of five columns, were read in proper sequence such that the readings were:

1st column—opaque
2nd column—transparent
3rd column—transparent
4th column—opaque
5th column—transparent this would correspond to the binary numbers 1 0 1 1 0 or the decimal number 22. This row then would be the decimal digit 22 position. In writing numbers in the binary scale, the usual convention of placing the most significant number first will be adopted throughout this specification.

In the conventional binary scale such as shown in Fig. 2, in moving the above reader from row 15 to row 16, a change from transparent to opaque occurs in the first four columns, and the change from opaque to transparent occurs in the fifth column. If the light-sensitive element reading the fifth column be delayed in noting the change in the fifth column, a signal is produced misapprehending all five columns as being opaque giving a decimal digit reading of 0 instead of 16.

While certain prior art binary scales, such as the reflected binary scale, have been designed to obviate this difficulty by using a code which permits a change in only one column in progressing from one number to another, they have several other disadvantages. The first disadvantage is that the code cannot readily be used for arithmetic purposes. A conversion to the conventional binary code is required before arithmetic can be readily accomplished. Secondly, its accuracy is limited by the accuracy of the divisions in all the columns, and since all columns must be read with the same accuracy as the column having the finest divisions, skewing between the reader and the scale cannot be tolerated. This places serious tolerance restrictions on the manufacture and mechanical mounting of such a scale and its associated reader. Thirdly, because the more significant columns can only be resolved on the small reader slit, the amount of light which can be directed to the light sensitive element is limited, thus limiting the sensitivity obtainable. The convetnional binary scale if read in the normal manner also has some of the disadvantages of the reflected binary scale in addition to its ambiguity.

In the drawings, Figure 1 is a circuit diagram in block form of a complete electronic reading system according to this invention for a binary scale and reader combination of the type disclosed and claimed in my copending application S.N. 573,154, filed March 22, 1956, entitled "Binary Scale Reader."

Figure 1:
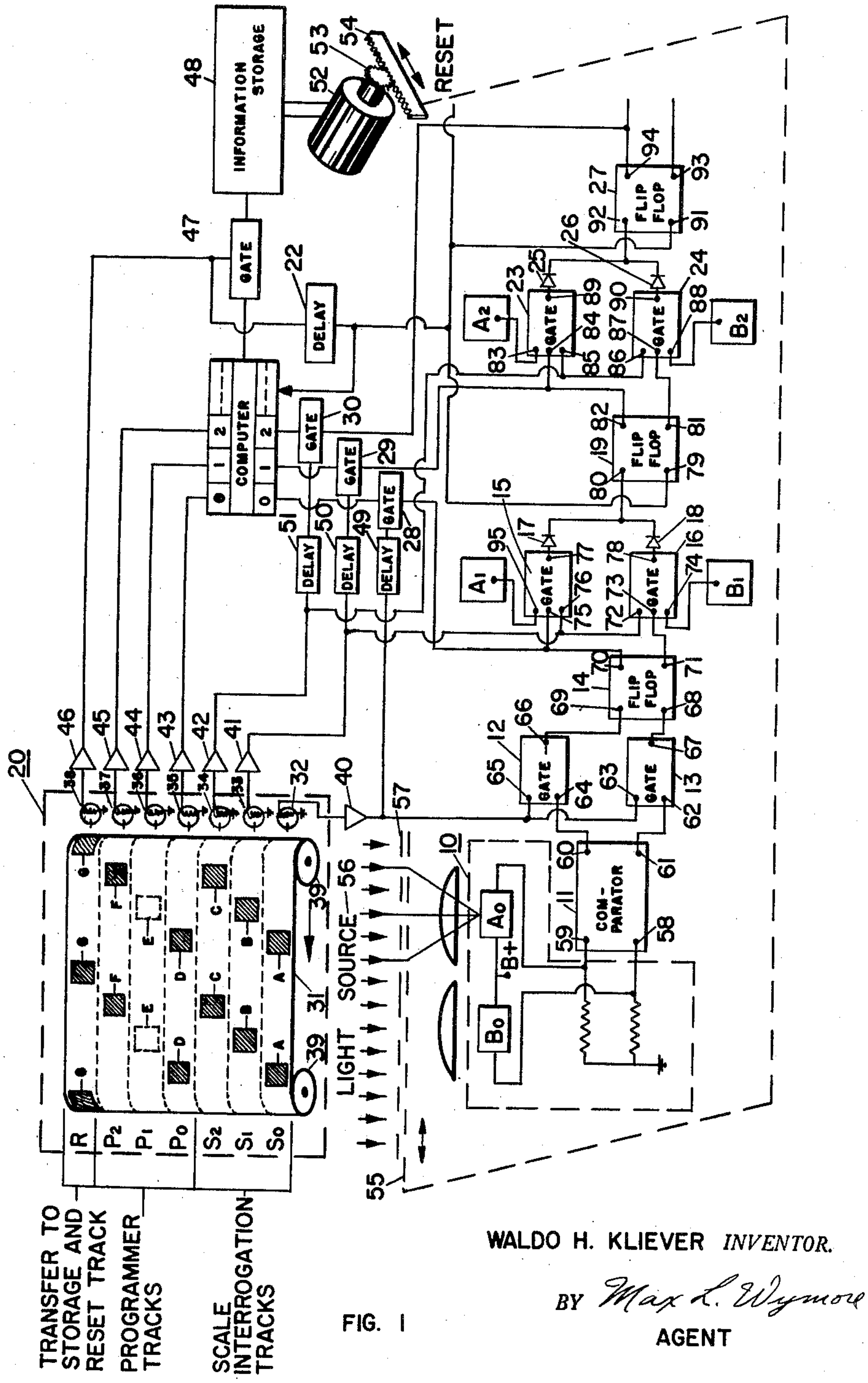

Referring to Figure 1 of the drawings, there is shown a block diagram of a complete scale reading system embodying this invention. The system comprises a pair of photoelectric sensing devices such as photo-cells $A_0$ and $B_0$ connected in a bridge circuit 10 which may include an amplifier. The outputs of bridge circuit 10 are connected to inputs of comparator means 11. Two "and" gates 12 and 13 are provided with an output of comparator 11 feeding an input of each gate. A second input of gates 12 and 13 is connected to an interrogation signal source 32 as will be explained later. Each of gates 12 and 13 have an output connected to an input of flip-flop 14. Each output of flip-flop 14 is connected to an input of a second pair of "and" gates 15 and 16. One output of flip-flop 14 is also connected to an input of computer 21 through gate 28. Photo-cells $A_1$ and $B_1$ through output circuits which may include an amplifier are connected to a second input of gates 15 and 16 respectively. A third input of gates 15 and 16 is connected to an interrogation signal source 33 as will be explained later. The outputs of gates 15 and 16 are connected together through isolating diodes 17 and 18 and to one input of flip-flop 19. The other input of flip-flop 19 is connected to a reset voltage source 38 through delay 22 as will be explained later. Each output of flip-flop 19 is connected to an input of a third pair of "and" gates 23 and 24. One output of flip-flop 19 is also connected to an input of computer 21 through gate 29. Photo-cells $A_2$ and $B_2$ through output circuits which may include an amplifier are connected to a second input of gates 23 and 24 respectively. A third input of gates 23 and 24 is connected to an interrogation signal source 34 as will be more fully explained later. The outputs of gates 23 and 24 are connected together through isolating diodes 25 and 26 and to one input of flip-flop 27. The other input of flip-flop 27 is connected to a reset voltage source 38 through delay 22 as will be explained later. Each output of flip-flop 27 is connected to an input of the next pair of gates and so on depending upon the number of digits to be read. One output of flip-flop 27 is connected to an input of computer 21 through gate 30 as will be explained later. The reading control 20 comprises an elongated magnetic recording medium 31 having a plurality of magnetizable track $S_0$, $S_1$, $S_2$, $P_0$, $P_1$, $P_2$ and R. A plurality of magnetic heads 32–38 are positioned adjacent each track such that when the recording medium 31 is traversed past the heads by reels 39 the portions of each track "*a*" through "*g*" that have been previously magnetized will induce a current flow in the head associated with that track and develop an output or interrogation signal. Amplifiers 40–46 may be required to amplify the signal induced in the heads to a usable level. Reset voltage track reading head 38 is further connected through amplifier 46 to an input of gate 47 which is connected between the output of computer 21 and the input of storage means 48 and through delay 22 to flip-flops 19 and 27 and computer 21. Programmer track reading heads 35, 36, and 37 are connected respectively through amplifiers 43, 44 and 45 to the programmer inputs of computer 21. Scale interrogation track reading heads 32, 33 and 34 are connected respectively through amplifiers 40, 41 and 42 to an input of gates 12, 13; 15, 16 and 23, 24 and through delays 49, 50 and 51 to an input respectively of gates 28, 29 and 30. Servo motor 52 is connected to the output of storage means 48. The shaft of servo motor 52 drives a pinion gear 53 and associated rack 54. Attached to rack 54 is a conventional binary scale 55 which is movably positioned between light source 56, reader 57 (least significant column shown) and photocells $A_0$ and $B_0$.

Figure 2:
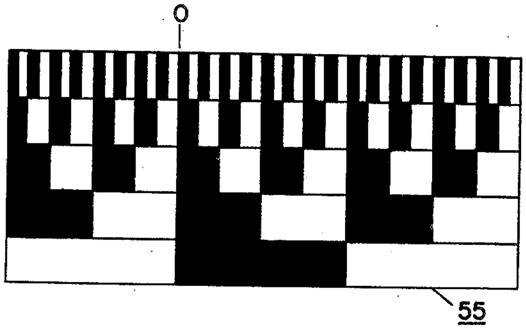
Figure 2 is a representation of an enlarged binary scale of conventional form.

Figure 2 illustrates a conventional binary scale. The conventional binary scale 55 has *n* columns of effectively transparent and effectively opaque areas arranged in a conventional binary progression, each having $2^n$ rows, where *n* is the number of digits in the scale. The conventional binary progression is one in which the effectively transparent and effectively opaque areas are disposed in columns such that each column represents ascending powers of two.

Figure 3:
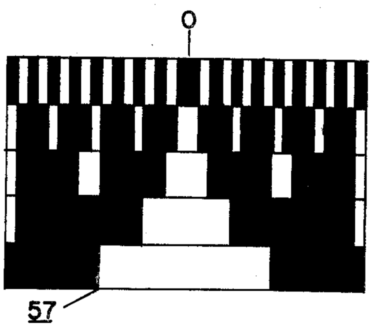
Figure 3 shows an enlarged reader for a conventional binary scale constructed according to the teaching set forth in my copending application set forth above.

Figure 3 shows a reader for a conventional binary scale constructed in accordance with the teaching of my copending application S.N. 573,154, filed March 22, 1956, entitled "Binary Scale Reader." The improved reader 57 comprises a plate having a plurality *n* of columns of effectively opaque and effectively transparent durable areas, where *n* is the number of digits in the binary scale, adjacent columns progressing from one side of the reader connoting successively greater digital significance, with one class of such reader areas disposed about a center line, the reader areas in each column of the reader being identically finite and less than the dimension, measured along the column, of like areas of the corresponding column of the conventional binary scale with which it is to be used, and the reader areas occur in each direction, along the column, away from the center line at the same cyclic repetition as the like areas of the corresponding column of the conventional binary scale, the resulting array of reader areas in each column of the reader more significant than the least significant column of the reader being symmetrically disposed about the center line, and the reader areas of the least significant column of the reader being identically finite and up to twice the dimension, measured along the column, of like areas of the least significant column of the conventional binary scale with which it is to be used and occur at the same cyclic repetition. The advantage of this reader over the use of the conventional single slit reader resides in the unambiguous readings obtainable, high resolution, high sensitivity in reading and increased reading accuracy while permitting greater tolerance in manufacture and mechanical mounting without adversely affecting reading accuracy.

Again referring to Figure 3, one half of the reader to one side of a centerline, designated 0 thereon, may conveniently be designated the A scale while the other side of the reader is designated the B scale. Each scale of the reader, i.e., A and B has a plurality of photocells positioned with respect thereto to receive light passing through a particular column of the respective scale. A photocell is associated with each column of each scale A and B with the photocells $A_0$ and $B_0$ being associated respectively with the least significant column of scales A and B of reader 57. Each column of greater significance will have a pair of photocells $A_1$, $B_1$; $A_2$, $B_2$, depending on whether the cells are associated with the A or B scale of the reader. It will be further appreciated that a photocell may encompass a plurality of cells in parallel associated with a particular column of the A or B scale of the reader.

Figure 4:
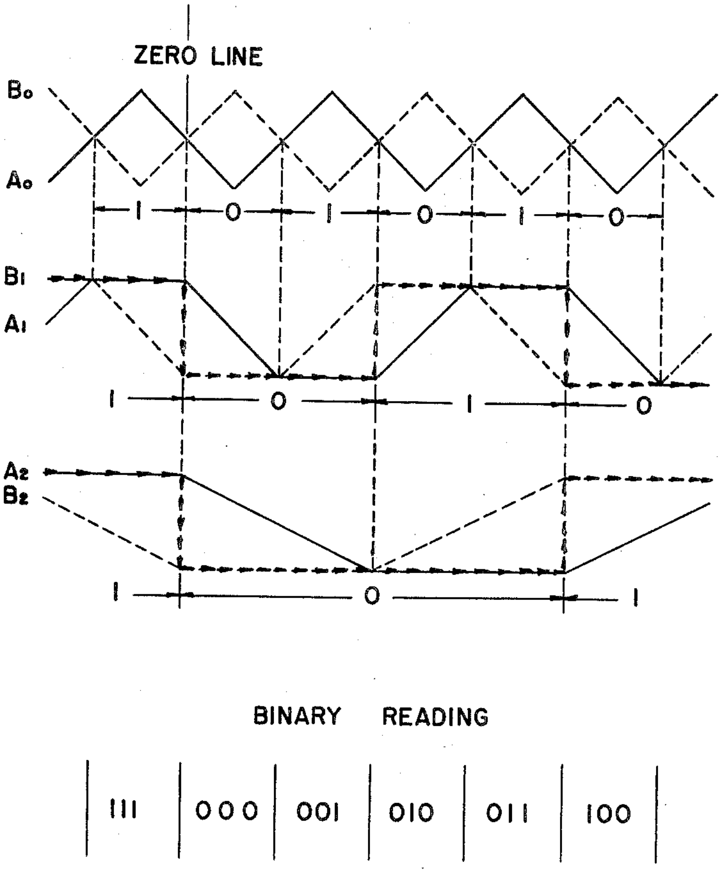
Figure 4 illustrates graphically the light intensity and switching sequence produced by the reader of Figure 3 when used with the scale of Figure 2 representing the first five decimal positions 0 to 4 of a 3 digit binary code.

Figure 4 is a graphic illustration of the photo-cell intensity and switching sequence in reading the first five positions of the scale 55 of Figure 2 with the reader 57 of Figure 3 employing a three digit binary code. While the reader 57 of Figure 3 is shown as having the A scale of the least significant column 180° out of phase with the B scale, it will be understood that other phase relationships may be successfully utilized. The intensities of photo-cells $A_0$, $A_1$ $A_2$—coacting with scale A of the reader are represented in Figure 4 by solid lines while the intensities of photo-cells $B_0$, $B_1$, $B_2$—coacting with scale B are represented by dotted lines. The arrowed lines represent the amplitude of the readout signals from the more significant columns with the vertical portions representing the switching sequence as accomplished by the reading system of this invention. Moving to the right on the graph represents the movement of the binary scale 55 of Figure 2 to the left with relation to the reader 57 of Figure 3. As the binary scale 55 is moved to the left from the zero line with relation to the reader 57, photo-cell $A_0$ goes through a minimum and photo-cell $B_0$ goes through a maximum. The point where the intensity of one cell which has previously been greater than the other cell becomes less than the other cell is defined as a switch point where the proper photo-cell $A_1$ or $B_1$ is read in the next column. It will be seen in the least significant column that when cell $B_0$ is brightest this is read as a "zero" and when cell $A_0$ is brightest this is read as a "one." This reading connotation may be reversed if desired. Referring to Figure 1, when scale 55 is in the "zero" or binary 000 position with respect to reader 57 cell $B_0$ is brightest and the higher voltage is applied to input 58 of comparator 11. An output voltage is developed on output 61 and applied to input 62 of gate 13. If a reading is called for by the presence of a magnetized spot "*a*" on scale interrogation track $S_0$ of the magnetic recording medium 31, an interrogation signal is developed by magnetic head 32 and applied to inputs 63 and 65 of gates 12 and 13. The application of the interrogation signal to input 63 of gate 13 permits the voltage applied to input 62 to pass through gate 13 and appear on output 67 thereof. The output of gate 13 is applied to the "zero" input 68 of flip-flop 14. This causes an output voltage to be developed on output 71 of flip-flop 14 and an absence of a voltage on output 70 of flip-flop 14. A readout voltage for the least significant column of scale 55 is taken from output 70 of flip-flop 14 and fed through gate 28 to an input of computer 21. Since there is an absence of voltage on output 70 of flip-flop 14, this is read by computer 21 as a "zero." The voltage appearing on output 71 of flip-flop 14 is fed to input 73 of gate 16. When a reading is called for as evidenced by the application of an interrogation signal from magnetic head 33 to input 72 of gate 16, the gate will pass the output voltage from output 71 of flip-flop 14 when a signal resulting from the illumination of cell $B_1$ is applied to input 74 of gate 16. If cell $B_1$ is dark as it is in the first position a voltage will be absent at the output 78 of gate 16 and will allow the flip-flop 19 to remain in its previous "zero" state. In this state there is an absence of a voltage on output 82 of flip-flop 19 which is fed through gate 29 to computer 21 and read as a "zero." An output voltage appearing on output 81 of flip-flop 19 is applied to input 87 of gate 24 and an interrogation signal from magnetic head 34 when called for is applied to input 86 of gate 24. Since cell $B_2$ is not illuminated in this position there will be no voltage applied to input 88 of gate 24 and an output from gate output 90 is absent. Thus flip-flop 27 will remain in the "zero" state. The absence of a voltage appearing on output 94 of flip-flop 27 on being applied to an input of computer 21 through gate 30 will be read as a "zero." It will be noted that each of the outputs 77, 78, 89 and 90 of gates 15, 16, 23 and 24 respectively are connected to inputs 80 and 92 of flip-flops 19 and 27 through isolating diodes 17, 18, 25 and 26. These diodes prevent a voltage appearing at the output of one gate from leaking off through the other gate.

At the same time the interrogation signals are applied to gates 12, 13, 15, 16, 23 and 24 from magnetic heads 32, 33 and 34, these signals are passed through delay circuits 49, 50 and 51 where the signals are delayed for an interval of time sufficient to allow the flip-flop to assume the state called for by the photo-cells before activating gates 28, 29, and 30 and allowing the readout signals to reach the inputs of computer 21. This may also be accomplished by the use of signals separate from the interrogation signals from a separate track or tracks and originated after the interrogation signal an interval of time to allow the flip-flops to assume the state called for by the photo-cells. Programmer signals developed by magnetic heads 35, 36 and 37 are applied through amplifiers 43, 44 and 45 to a second set of inputs of computer 21. In computer 21 the programmer signals and readout signals from flip-flops 14, 19 and 27 are compared and any difference will appear on the output a computer 21 as an error signal.

At the end of each reading a reset voltage is developed by magnetic head 38 in response to magnetized spots "g" on the magnetizable record medium 31. This reset voltage is applied to an input of gate 47 connected between the output of computer 21 and the input of information storage 48. On activation of gate 47 the error signal appearing on the output of computer 21 if any is transferred to storage 48. The reset voltage is further applied through delay 22 to computer 21 to clear it of previous readings and to flip-flops 19 and 27 to reset them to the "zero" state in preparation for the next reading.

The error signal if any stored in information storage 48 is fed to servo motor 52 which through pinion 53 moves rack 54 and attached binary scale 55 toward the new position called for by the pattern of magnetic spots *d*, *e* and *f* on programmer tracks $P_0$, $P_1$ and $P_2$.

Assuming that the scale 55 is moved to the fourth position or binary 011 position, the $A_0$ cell is more brightly illuminated and a higher voltage is applied to input 59 of comparator 11 causing a voltage to appear at output 60 of comparator 11 which is in turn applied to input 64 of gate 12. On application of an interrogation signal to input 65 of gate 12 from magnetic head 32 the comparator output voltage is transmitted to input 69 of flip-flop 14 via output 66 of gate 12. The application of a voltage to input 69 flips that circuit to the "one" state and a readout signal appears on output 70. This signal is applied to input 75 of gate 15 and to an input of computer 21 after a delay interval, through gate 28, where

8 it is read as a "one" by computer 21. On application of an interrogation signal from magnetic head 33 to input 76 of gate 15 and the application of a voltage to input 95 of gate 15 from cell $A_1$ since cell $A_1$ is illuminated in this position, the readout signal is transmitted via output 77 of gate 15 to input 80 of flip-flop 19. The application of a voltage to input 80 flips that circuit to the "one" state and a voltage appears on output 82 of flip-flop 19 as the readout signal. This signal is applied to input 84 of gate 23 and to an input of computer 21, after a delay interval, through gate 29, where it is read as a "one" by computer 21. On application of an interrogation signal from magnetic head 34 to input 85 of gate 23 and the application of a voltage from cell $A_2$ to input 83 of gate 23 the readout signal from output 82 would be transmitted to input 92 of flip-flop 27. Since the $A_2$ cell is dark in this position the readout signal is not transmitted through gate 23. Thus no voltage is applied to input 92 and flip-flop 27 remains in the "zero" state. There being no signal on output 94 of flip-flop 27 to be transmitted to computer 21, via gate 30, this is read by computer 21 as a "zero." The reading by computer 21 is thus 011 with the most significant number appearing first. If this is the position called for by the programmer tracks of reading control 20, no error signal will appear on the output of compueter 21 to be stored in storage 48 and servo motor 52 will not be activated.

Figure 5:
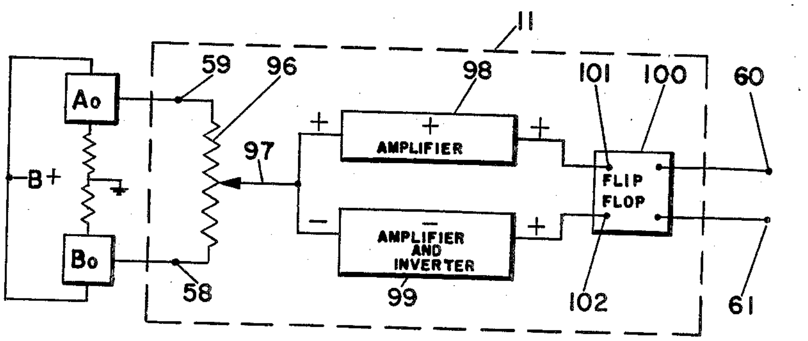
Figure 5 illustrates a block diagram of one form the comparator 11 of Figure 1 may take.

Figure 5 illustrates one form which comparator 11 may take. The function of comparator 11 is to compare the outputs of cells $A_0$ and $B_0$ and open gate 12 or gate 13 depending on whether cell $A_0$ or cell $B_0$ develops a higher output. This can be accomplished in one instance by placing cells $A_0$ and $B_0$ in a bridge circuit with the output of cells $A_0$ and $B_0$ connected to either end of potentiometer 96.

Sliding tap 97 of potentiometer 96 is adjusted to the point where the voltage thereon is zero when the output signals from cells $A_0$ and $B_0$ are applied to the ends of potentiometer 96 and both cells are illuminated. This permits compensation for any lack of symmetry in the components of the reading system. When one cell develops a higher output a positive voltage appears on tap 97 and when the other cell develops a higher output a negative voltage appears on tap 97. Tap 97 is connected to the input of a negative voltage amplifier 98 which produces and applies a positive voltage to input 101 of flip-flop 100 when a positive voltage is applied to slider 97. Sliding tap 97 is further connected to the input of a negative voltage amplifier and inverter 99 which produces and applies a positive voltage to input 102 of flip-flop 100 when a negative voltage is applied to slider 97. Thus when cell $A_0$ develops a higher output a voltage is produced on comparator output 60 and when cell $B_0$ develops a higher output a voltage is produced on comparator output 61. It will be understood that any circuit which will perform the function of producing an output voltage on one output when the output of one cell is higher and an output voltage on the other output when the output of the other cell is higher may be substituted and it is intended that the invention not be necessarily limited to the specific comparator circuit shown. In the instance where a sufficiently high output from the cells is obtainable the amplifiers may not be required. Where a flip-flop such as that shown in Figure 6 is utilized for flip-flop 100 the output of the cell bridge appearing on tap 97 may be fed directly into the control grid of the tube 103 since the circuit of Figure 6 will flip to one state on the application of a positive signal to the grid and flip to the other state on the application of a negative signal to the grid as will be more fully explained later.

Figure 6:
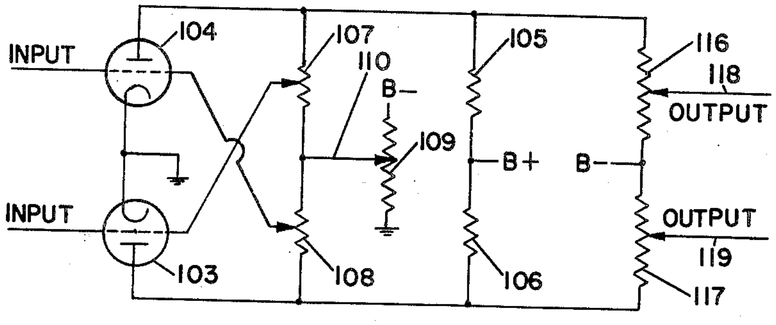
Figure 6 shows the schematic diagram of one form of the bistable circuit means or flip-flops of Figure 1.

Figure 6 illustrates schematically a preferred form of the flip-flops of Figure 1 although others may be used with equal success. This flip-flop circuit is a two-tube flip-flop and is similar to one found in "The Electronic Engineering Handbook," Batcher and Moulic, Electronic Development Associates, New York, N.Y., 1944, page 309, Figure 227II. In this circuit assume that there is no signal voltage on the grid of tube 104. In this case the grids of both tubes 104 and 105 will be at cathode potential. This is accomplished by the bridge circuit formed by the resistors 105, 106, 107 and 108 where a point can be found on resistors 107 and 108 which is at cathode potential. If now a positive voltage is applied to the control grid of tube 103 the plate current of this tube will increase which in turn increases the voltage drop across resistor 106 and lowers the plate voltage of tube 103. Since the control grid of tube 104 is connected to the plate of tube 103 through resistor 108, the decrease in plate voltage of tube 103 will cause the grid of tube 104 to become more negative. This decreases its plate current thereby increasing the voltage drop across resistor 105 causing the plate voltage of tube 103 to increase. However, since the grid of tube 103 is connected to the plate of tube 104 through resistor 107, the increase in plate voltage of tube 104 causes the grid of tube 103 to become more negative which again increases the plate current of that tube. The cumulative effect which causes the grid of tube 103 to become so positive that the current through this tube becomes a maximum, causes the grid of tube 104 to become negative, so that the current through this tube is at a minimum. If a negative initiating voltage had been applied to the grid of tube 103 or a positive initiating voltage had been applied to the grid of tube 104 the action would have been in the opposite direction, i.e., the plate current of tube 103 becomes minimum and that of tube 104 maximum. In actual operation this reversal is almost instantaneous. Potentiometers 116 and 117 are connected serially across the plates of tubes 103 and 104 and a B minus potential is connected to their common terminals. Output voltages are taken from sliding taps 118 and 119 respectively of potentiometers 116 and 117. Tap 118 is adjusted to the point where a zero voltage appears thereon when tube 104 is conducting and tap 119 is adjusted to the point where a zero voltage appears thereon when tube 103 is conducting. When the B plus potential is equal but opposite to the B minus potential these points will be the center of the resistance range of potentiometers 116 and 117. Thus a positive initiating voltage applied to the control grid of tube 103 or a negative voltage applied to the control grid of tube 104 will cause a voltage to appear on the output connected to tap 118 while a positive initiating voltage applied to the control grid of tube 104 or a negative voltage applied to the control grid of tube 103 will cause a voltage to appear on the output connected tap 119.

In comparator 11, Figure 5, using the flip-flop circuit of Figure 6 for flip-flop 100 the potentiometer slider 97 may be connected directly to the control grid of tube 103. When a positive voltage is applied to the grid an output voltage appears on the output connected to tap 118. When a negative voltage is applied to the grid an output voltage appears on the output connected to tap 119. It will be noted that the common connection between resistors 107 and 108 is connected to a sliding contact 110 of potentiometer 109 which is connected to a source of B minus potential. The adjustment of contact 110 provides the further advantageous means of adjusting the differential voltage required for operation of the flip-flop to make it appropriate to the available signals and have the sensitivity required for most efficient operation.

Figure 7:
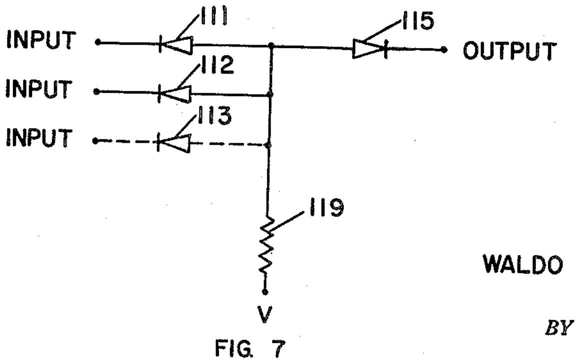
Figure 7 shows a preferred form of the gate circuits of Figure 1 schematically.

Figure 7 illustrates one form of a multiple input gate circuit which may be used in the system of Figure 1. Shown are two input diodes 111 and 112 and a third diode 113, if required, with inputs connected to each cathode of the diodes. A voltage V is connected to the anode of each diode through resistor 119 and to the anode of isolation diode 115 to output. In the absence of a positive potential on all inputs at least as high as the potential V, the potential V will leak back through the inputs and will not appear on the output. With a positive potential on the inputs at least as high as potential V an output voltage will appear on the output equivalent to the potential V. Thus when all inputs receive a signal a signal is present on the output. In the absence of a signal on one or more inputs no output signal will be evident.

It will be appreciated that the reading control may comprise any control device capable of producing signals according to a prearranged program. As indicated the reading control may consist of a magnetizable record medium having areas magnetized according to such program, punched tape or cards punched according to such program or in some instances a cyclic stepping switch or a switching tube which may be self cycling in operation or be cycled by a series of pulses from a magnetizable storage medium or other such storage medium according to a prearranged program.

Another embodiment of the invention, involving a minor modification of the circuit shown in Figure 1, provides self-cycling reading of the binary scale and reader by cells $A_1$, $B_1$; $A_2$, $B_2$, etc. This eliminates the need for supplying interrogation signals to gates 15, 16; 23, 24, etc., thus gates 15, 16 and 23, 24 need have only two inputs, with inputs 72, 76, 85 and 86 not required. In this embodiment flip-flops 19, 27 and those following are of mono-stable design and are adapted to be stable in the "zero" state in the absence of a signal being applied to their input. The application of a signal to their input causes the flip-flop to flip to the "one" state. The need for supplying a reset voltage to the "zero" input of the flip-flops prior to the next reading is eliminated since in the absence of a signal applied to the "one" input, the flip-flop reverts to the "zero" state if previously in the "one" state.

With scale 55 in the fourth position or binary 011 position, the operation of this embodiment is as follows: since the $A_0$ cell is more brightly illuminated, a higher voltage is applied to input 59 of comparator 11, causing a voltage to appear at output 60 of comparator 11, which is, in turn, applied to input 64 of gate 12. Where it is desired to control the interrogation of the scale, an interrogation signal is applied to input 65 of gate 12 from magnetic head 32 and the comparator output voltage is transmitted to input 69 of flip-flop 14 via output 66 of gate 12. It will be noted at this point if it is not desired to control the interrogation of the scale, gates 12 and 13 may be deleted and comparator outputs 60 and 61 may be directly connected to inputs 69 and 68 of flip-flop 14 respectively.

The application of a voltage to input 69 of flip-flop 14, flips that circuit to the "one" state and a readout signal appears on output 70. This signal is applied to input 75 of gate 15 and to an input of computer 21, where it is read as a "one" by computer 21. On application of a voltage to input 95 of gate 15 from cell $A_1$, since cell $A_1$ is illuminated in this position, the readout signal is transmitted via output 77 of gate 15 to input 80 of flip-flop 19. The application of a voltage to input 80 flips that circuit to the "one" state and a voltage appears on output 82 of flip-flop 19 as the readout signal. This signal is applied to input 84 of gate 23 and to an input of computer 21, where it is read as a "one" by computer 21. On the application of a voltage from cell $A_2$ to input 83 of gate 23, the readout signal would be transmitted to input 92 of flip-flop 27. Since the $A_2$ cell is dark in this position, the readout signal is not transmitted through gate 23. Thus no voltage is applied to input 92 and flip-flop 27 remains or reverts to the "zero" state. There being no signal on output 94 of flip-flop 27, to be transmitted to computer 21, this is read by computer 21 as a "zero."

The reading by computer 21 is thus 011, with the most significant number appearing first.

Although the above described embodiments disclose the binary scale and reader as adapted to being read optically, it is to be understood that the scale and reader may be constructed to be read by other types of sensing devices other than optical, i.e., magnetic, inductive, capacitive or mechanical, a similar reading of scale may be made with the proper sensing devices and suitable circuit modifications.

Various modifications may be made in the optical sensing arrangement within the teaching of this invention, such as multiple light, single cell, multiple light area cell and electro luminescent source, among others as will be understood by those skilled in the art.

While there have been described what at present are considered to be the preferred embodiments of this invention, it will be obvious to those skilled in the art that various changes and modifications may be made therein without departing from the invention. It is aimed therefore in the appended claims to cover all such changes and modifications which fall within the true spirit and scope of the invention.

What is claimed is:

1. A binary scale reading system comprising comparator means for simultaneously comparing two signals each being representative of a different condition and developing an output voltage on one of two outputs thereof representative of the signal having the greater amplitude, first gate means for transmitting the output voltage developed in response to the application of the output voltage of the comparator means and an interrogation signal to the inputs of first gate means, the interrogation signal being applied to accomplish a reading function; a first flip-flop circuit means adapted to develop a voltage on one output in the absence of a transmitted output voltage from one output of said comparator means and to develop a voltage on another output in the presence of a transmitted output voltage from said one output of said comparator means, second gate means for transmitting an output voltage from said first flip-flop circuit means developed in response to the first flip-flop output voltage and an interrogation signal fed to said second gate means to accomplish a reading function and a second flip-flop circuit means having an input fed by a second gate means and adapted to develop a voltage on one output in the presence of a transmitted output voltage from a second gate means and to develop a voltage on another output in the absence of a transmitted output voltage from a second gate means.

2. A binary scale reading system comprising means for simultaneously comparing two signals each being representative of a different condition and developing an output voltage on one of two outputs thereof representative of the signal having the greater amplitude, first gate means for transmitting the output voltage developed, in response to the application of the comparing means output voltage and an interrogation signal to inputs of a first gate means the interrogation signal being applied to accomplish a reading function, mono-stable circuit means adapted to develop a voltage on one output in the absence of a transmitted output voltage from a first gate means and to develop a voltage on another output in the presence of a transmitted output voltage from a first gate means, second gate means for transmitting an output voltage from said mono-stable circuit means developed in response to the mono-stable circuit output voltage and an interrogation signal fed to said second gate means to accomplish a reading function and a second mono-stable circuit means having one input fed by a second gate means and adapted to develop a voltage on one output in the presence of a transmitted output voltage from said second gate means and to develop a voltage on another output in the absence of a transmitted output voltage from said second gate means.

3. A binary scale reading system comprising means for simultaneously comparing two signals each being representative of a different condition and developing an output voltage on one of two outputs thereof representative of the signal having the greater amplitude, first gate means for transmitting an output voltage developed in response to the application of the comparing means output voltage and an interrogation signal to inputs of a first gate means, the interrogation signal being applied to accomplish a reading function, bistable circuit means adapted to develop a voltage on one output in the absence of a transmitted output voltage from a first gate means and to develop a voltage on another output in the presence of a transmitted output voltage from a first gate means, second gate means for transmitting an output voltage from said bistable circuit means developed in response to the bistable circuit output voltage, an interrogation signal and a third signal, the interrogation signal being applied to accomplish a reading function, second bistable circuit means having one input fed by said second gate means and adapted to develop a voltage on one output in the presence of a transmitted output voltage from said second gate means and to develop a voltage on another output in the absence of a transmitted output voltage from said second gate means, means for developing a reset signal and means for applying such reset signal to another input of said second bistable circuit means to reset said bistable circuit to a predetermined state in preparation for a reading, a reading control comprising means for developing interrogation signals according to a prearranged program and means for applying an interrogation signal to an input of each gate means on command.

4. A binary scale reading system, comprising a first pair of sensing devices having output circuits and adapted to produce an output signal on being activated, comparator means having at least one input and two outputs for comparing the output signal produced by each sensing device and develop a comparator voltage on the respective one of said two comparator outputs corresponding to the sensing device output signal having the greater amplitude, means for applying the output signals from the sensing devices to the comparator input, first gate means having at least one input and an output for transmitting a gate voltage equivalent to said comparator voltage in response to the application of said comparator voltage and an interrogation signal applied to accomplish a reading function, means for applying said comparator voltage and an interrogation signal to said input, a first bistable circuit means having two outputs and two inputs adapted to develop and sustain a first readout signal on one of said outputs in response to the application of a gate voltage to the respective input, means for applying the gate voltage to a bistable circuit input, a second pair of sensing devices each having an output circuit and adapted to produce an output signal on being activated, second gate means having at least two inputs and an output for transmitting a gate voltage equivalent to said first readout signal in response to the application of said readout signal, an output voltage from a sensing device of the second pair and an interrogation signal to said inputs, the interrogation signal being applied to accomplish a reading function, means for applying said first readout voltage, a sensing device output voltage and an interrogation signal to the inputs of said second gate means, a second bistable circuit means having two inputs and two outputs adapted to develop and sustain a second readout signal on one of said outputs in response to the application of a gate voltage to one input, means for applying a gate voltage from a second gate to an input of said bistable circuit means and a reading control means adapted to supply an interrogation signal to an input of each gate means on command and further adapted to supply a reset voltage to the second input of said second bistable circuit means to reset the bistable circuit to a predetermined state prior to a subsequent reading.

5. A binary scale reading system, comprising a first pair of sensing devices adapted to produce an output signal on being activated connected in a bridge circuit having two outputs, comparator means having two inputs and two outputs for comparing output signals of said bridge circuit and develop a comparator voltage on the respective one of said comparator outputs corresponding to the sensing device producing the greater output, means for applying signals from said bridge circuit outputs to said comparator inputs, a first pair of gate means each having at least one input and an output for transmitting a gate voltage equivalent to a voltage developed on a comparator output in response to the application of a comparator output voltage and an interrogation signal to the inputs of one gate of said first pair, the interrogation signal being applied to accomplish a reading function, means for applying a comparator output voltage and an interrogation signal to the inputs of one gate of said pair, a first bistable circuit means having two outputs and two inputs adapted to develop and sustain a first readout signal on one of said outputs in response to the application of a gate voltage to the respective input, means for applying a gate voltage from the output of one of said first pair of gates to an input of said bistable circuit means a second pair of sensing devices each having an output circuit and adapted to produce an output signal on being activated, a second pair of gate means each having at least two inputs and an output for transmitting a gate voltage equivalent to a first readout signal in response to the application of a readout signal, an output voltage from a sensing device of said second pair and an interrogation signal to the inputs of one gate of said second pair, the interrogation signal being applied to accomplish a reading function, means for applying a comparator output voltage, a sensing device output voltage and an interrogation signal to the inputs of one gate of said second pair, a second bistable circuit means having two outputs and two inputs adapted to develop and sustain a second readout signal on one of said outputs in response to the application of a gate voltage to one of said inputs, means for applying a gate voltage from the output of one of said second pair of gates to an input of said second bistable circuit means, means for developing a reset signal and means for applying a reset signal to said other input of said second bistable circuit means to reset said second bistable circuit means to a predetermined state in preparation for a reading, and a reading control comprising means adapted to develop interrogation signals according to a prearranged program and means for applying an interrogation signal to an input of each gate means on command.

6. A binary scale reading system, comprising a first pair of photo-cells having output circuits, comparator means having at least one input and two outputs for comparing the outputs of said first pair of photo-cells and develop a comparator voltage on the respective one of said comparator outputs corresponding to the photo-cell producing the greater output, means for applying signals from the output of said photo-cells to said comparator input, a first pair of gate means each having at least one input and an output for transmitting a gate voltage equivalent to a voltage developed on a comparator output in response to the application of a comparator output voltage and an interrogation signal to the inputs of one gate of said first pair, the interrogation signal being applied to accomplish a reading function, means for applying a comparator output voltage and an interrogation signal to the inputs of one gate of said pair, a first bistable circuit means having two outputs and two inputs adapted to develop and sustain a first readout signal on one of said outputs in response to the application of a gate voltage to the respective input, means for applying a gate voltage from the output of one of said first pair of gates to an input of said bistable circuit means, a second pair of photo-cells each having an output and adapted to produce an output voltage on being activated, a second pair of gate means each having at least two inputs and an output for transmitting a gate voltage equivalent to a first readout signal in response to the application of a readout signal, an output voltage from a photo-cell of said second pair and an interrogation signal to the inputs of one gate of said second pair, the interrogation signal being applied to accomplish a reading function, means for applying a comparator output voltage, a photo-cell output voltage and an interrogation signal to the inputs of one gate of said second pair, a second bistable circuit means having two outputs and two inputs adapted to develop and sustain a second readout signal on one of said outputs in response to the application of a gate voltage to one of said inputs, means for applying a gate voltage from the output of one of said second pair of gates to an input of said second bistable circuit means, means for developing a reset signal and means for applying a reset signal to said other input of said second bistable circuit means to reset said second bistable circuit means to a predetermined state in preparation for a reading and a reading control comprising means for developing interrogation signals according to a prearranged program and means for applying interrogation signals to an input of each gate means on command.

7. A binary scale reading system, comprising a first pair of photo-cells having output circuits, comparator means having at least one input and two outputs for comparing the outputs of said first pair of photo-cells and develop a comparator voltage on the respective one of said comparator outputs corresponding to the photo-cell producing the greater output, means for applying signals from the output of said photo-cells to said comparator input, a first pair of gate means each having at least one input and an output for transmitting a gate voltage equivalent to a voltage developed on a comparator output in response to the application of a comparator output voltage and an interrogation signal to the inputs of one gate of said first pair, the interrogation signal being applied to accomplish a reading function, means for applying a comparator output voltage and an interrogation signal to the inputs of one gate of said pair, a first bistable circuit means having two outputs and two inputs adapted to develop and sustain a first readout signal on one of said outputs in response to the application of a gate voltage to the respective input, means for applying a gate voltage from the output of one of said first pair of gates to an input of said bistable circuit means, a second pair of photo-cells each having an output and adapted to produce an output voltage on being activated, a second pair of gate means each having at least two inputs and an output for transmitting a gate voltage equivalent to a first readout signal in response to the application of a readout signal, an output voltage from a photo-cell of said second pair and an interrogation signal to the inputs of one gate of said second pair, the interrogation signal being applied to accomplish a reading function, means for applying a comparator output voltage, a photocell output voltage and an interrogation signal to the inputs of one gate of said second pair, a second bistable circuit means having two outputs and two inputs adapted to develop and sustain a second readout signal on one of said outputs in response to the application of a gate voltage to one of said inputs, means for applying a gate voltage from the output of one of said second pair of gates to an input of said second bistable circuit means, means for developing a reset signal and means for applying a reset signal to said other input of said second bistable circuit means to reset said second bistable circuit means to a predetermined state in preparation for a reading, reading control means comprising means for developing interrogation and programming signals according to a prearranged program, means for applying interrogation signals to an input of each gate means, computer means for comparing the readout signals from each bistable circuit means and the programming signals and develop an error voltage representative of a difference, and means for applying readout signals and programming signals to said computer.

8. A binary scale reading system comprising a first pair of sensing devices having output circuits and adapted to produce an output signal on being activated, comparator means having at least one input and two outputs for comparing the output signal produced by each sensing device and develop a comparator voltage on the respective one of said two comparator outputs corresponding to the output of the sensing device having the greater amplitude, means for applying the output signals from the sensing devices to the comparator input, first gate means having at least one input and at least one output for transmitting a gate voltage equivalent to said comparator voltage in response to the application of said comparator voltage and an interrogation signal thereto, the interrogation signal being applied to accomplish a reading function, means for applying said comparator voltage and an interrogation signal to said first gate input, a first flip-flop means having two outputs and at least one input adapted to develop and retain a first readout signal on one of said outputs in response to the application of a gate voltage to an input, means for applying the gate voltage to an input of said first flip-flop, a second pair of sensing devices each having an output circuit and adapted to produce an output signal on being activated, second gate means having at least two inputs and an output for transmitting a gate voltage equivalent to a first readout signal in response to the application thereto of a readout signal, an output voltage from a sensing device of the second pair and an interrogation signal, the interrogation signal being applied to accomplish a reading function, means for applying a first readout signal, a sensing device output voltage and an interrogation signal to the inputs of said second gate means, a second flip-flop means having two outputs and at least one input adapted to develop a second readout signal on one of said outputs in response to the application of a gate voltage to an input, means for applying a gate voltage from a second gate to an input of said second flip-flop means and a reading control means adapted to supply an interrogation signal to an input of each gate means on command.

9. A binary scale reading system according to claim 8, wherein the flip-flop means are mono-stable.

References Cited in the file of this patent

UNITED STATES PATENTS

| | | |
|---|---|---|
| 2,674,733 | Robbins | Apr. 6, 1954 |
| 2,679,638 | Bensky et al. | May 25, 1954 |
| 2,798,216 | Goldberg et al. | July 2, 1957 |